W. M. ARNALL.
Grain Separator.
No. 1,000. Reissued July 10, 1860.
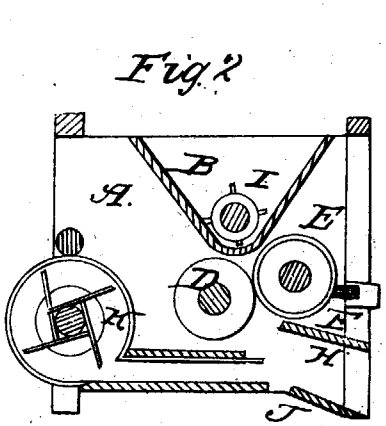
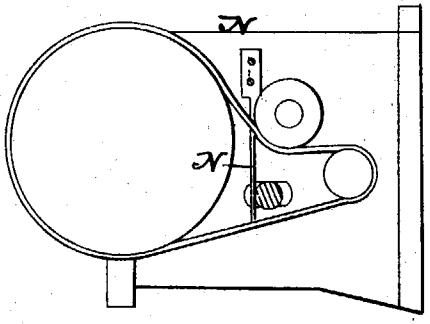
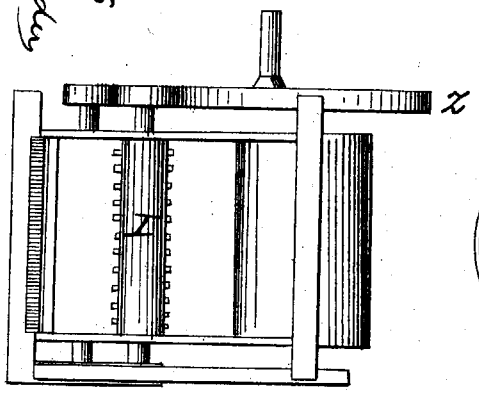
WITNESSES
C. H. Alexander
John P. Jacobs.
INVENTOR
Wm M Arnall
N. PETERS, Photo-Lithographer, Washington, D. C.

UNITED STATES PATENT OFFICE.

WILLIAM M. ARNALL, OF SPERRYVILLE, VIRGINIA.

IMPROVEMENT IN GRAIN SEPARATORS AND CLEANERS.

Specification forming part of Letters Patent No. 28,046, dated May 1, 1860; Reissue No. 1,000, dated July 10, 1860.

*To all whom it may concern:*

Be it known that I, WM. M. ARNALL, of Sperryville, in the county of Rappahannock and State of Virginia, have invented certain new and useful Improvements in Grain-Cleaners; and I do hereby declare that the following is a full, clear, and exact description of the same, reference being had to the accompanying drawings, and to the letters of reference marked thereon.

The nature of my invention consists in constructing and arranging the several parts of this machine substantially in the manner hereinafter specified.

In the annexed drawings, Figure 1 represents a plan view of the machine. Fig. 2 is a vertical section. Fig. 3 is a side view of the machine.

In the figures, A represents a frame, which is constructed in a substantial manner and of any convenient size. In this frame is secured a hopper, B, which is V-shaped, as is represented in the drawings. In the bottom and longitudinally of the hopper is placed a cylinder, I, which is provided on its periphery with teeth or pins *c c c*. This cylinder revolves, and the pins upon it serve to distribute and equalize the grain as it passes down to the cylinders beneath.

D and E represent two cylinders, which are secured in the frame A under the hopper B and parallel with the cylinder I. The cylinder D is provided with a hard periphery, while the cylinder E is provided with a yielding or pliable one. The periphery of the cylinder E is made pliable by securing cloth or any other suitable substance upon it. I regard cotton felt as a good material for covering the roller or cylinder. The peripheries of the two cylinders D and E are placed close together, touching each other, one being held against the other by means of a spring, N, seen in Fig. 3.

When the grain falls from the hopper, it passes between these two cylinders D and E, and the surface of the cockle being bearded, while that of the wheat is smooth, the cockle catches into the felt upon the cylinder E, and is carried around away from the wheat, and is removed from the said cylinder by means of a brush, F.

I use a hard and a soft surface together, because the hard surface presses the cockle beard into the soft surface, and thus it is carried securely away. Where two felt surfaces are used, the cockle sticks alike to both, and when the two surfaces part, being drawn in two directions, its hold on the cylinders is partially loosened, and the wheat falling against it removes a great deal of it from the cylinders, and it is thus carried down with the wheat.

I am aware that a series of felt rollers are used for the purpose of removing the cockle from grain; but it almost impossible, even with a series to remove the cockle, for the reason above assigned.

The beard of the cockle cannot, and does not, penetrate a hard substance, and it is necessary to use a hard surface in connection with a soft one in order that the beard may be so secured in the soft surface that it cannot be removed by the parting of the rollers and the friction of the falling grain.

The spring which is used for holding the two cylinders together, and which allows of their adjustment to and from each other is necessary for the proper and practical working of the machine. One cylinder requires to be pressed against the other to make the cockle stick properly, and this cannot be done effectually without the spring.

H represents a dividing-board, which is secured under the cylinder E, and which is used for the purpose of securing the cockle, &c., which is removed from said cylinder by means of the brush F′, said brush F′ being placed longitudinally of the cylinder E, and in such proximity to it that it will touch it, and thus brush off the cockle which clings to the cylinder. The board H being inclined, the cockle passes out to the rear of the machine, and is thus separated from the wheat, which falls through the opening J into any proper receptacle for receiving it.

The cylinder I serves to equalize and distribute the grain in its passage to the cylinders beneath, so that the body of grain passing between the cylinders may be of uniform thickness.

K represents a fan, which sends a blast of air through the falling grain in order to remove any dirt or dust or chaff which may remain in it.

The three cylinders and the fan are all driven by the same band, L. They may be driven by gearing or otherwise, as may be desirable.

Having thus fully described my invention, what I claim as new, and desire to secure by Letters Patent, is—

1. The combination of the distributing and equalizing cylinder I with the separating cylinders D and E, the same being used as and for the purpose specified.

2. The arrangement of the cylinder I and adjusting-spring N, or their equivalents, with the cylinders D and E, and with the brush F, when the same are used substantially as for the purpose specified.

WM. M. ARNALL.

Witnesses:

C. M. ALEXANDER,

A. A. YEATMAN.